United States Patent
Burgmeier et al.

(10) Patent No.: US 9,864,793 B2
(45) Date of Patent: *Jan. 9, 2018

(54) LANGUAGE TAG MANAGEMENT ON INTERNATIONAL DATA STORAGE

(71) Applicant: International Business Machines Corporation, Armonk, NY (US)

(72) Inventors: Amanda Y. Burgmeier, Austin, TX (US); Su Liu, Round Rock, TX (US); Kiai Weidemann, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 535 days.

This patent is subject to a terminal disclaimer.

(21) Appl. No.: 14/100,157

(22) Filed: Dec. 9, 2013

(65) Prior Publication Data

US 2015/0142813 A1 May 21, 2015

Related U.S. Application Data

(63) Continuation of application No. 14/084,890, filed on Nov. 20, 2013.

(51) Int. Cl.
*G06F 7/00* (2006.01)
*G06F 17/00* (2006.01)
*G06F 17/30* (2006.01)

(52) U.S. Cl.
CPC .. *G06F 17/30598* (2013.01); *G06F 17/30011* (2013.01)

(58) Field of Classification Search
CPC ........ G06F 17/30011; G06F 17/30598; G06F 17/30873; G06F 17/30882; G06F 17/30864
See application file for complete search history.

(56) References Cited

U.S. PATENT DOCUMENTS 7,548,927 B2    6/2009  Turner, Jr. et al.
7,627,598 B1 *  12/2009 Burke ............... G06F 17/30864

(Continued)

FOREIGN PATENT DOCUMENTS

CN    101043346    9/2007
CN    101996207    3/2011
WO    2007148289   12/2007

OTHER PUBLICATIONS

Ishida, Richard; Language tags in HTML and XML; WC3; First published Sep. 20, 2006; Last substantive update Sep. 10, 2009.

(Continued)

*Primary Examiner* — Hasanul Mobin
(74) *Attorney, Agent, or Firm* — James L. Baudino

(57) ABSTRACT

According to one aspect of the present disclosure, a method and technique for language tag management includes: accessing a standardized language tag repository to identify changes in repository language tags; searching records of a data source categorized using language tags to identify language tags present in records of the data source; determining whether the language tags present in the records of the data source are inconsistent with the repository language tags; responsive to determining that the language tags present in the records of the data source are inconsistent with the repository language tags, determining a language tag update policy for the data source; and performing a language tag update process for the records according to the language tag update policy to re-categorize the records based on the repository language tags.

5 Claims, 8 Drawing Sheets

(56) References Cited

U.S. PATENT DOCUMENTS

| | | | | |
|---|---|---|---|---|
| 8,676,863 | B1* | 3/2014 | Connell | G06F 17/30917 |
| | | | | 707/804 |
| 2003/0154071 | A1* | 8/2003 | Shreve | G06F 17/2845 |
| | | | | 704/9 |
| 2004/0034521 | A1* | 2/2004 | Kawakura | G06F 17/275 |
| | | | | 704/1 |
| 2005/0065930 | A1* | 3/2005 | Swaminathan | G06F 17/30011 |
| 2005/0234785 | A1 | 10/2005 | Burman et al. | |
| 2009/0282060 | A1* | 11/2009 | Paulussen | G06F 17/3002 |
| 2009/0287471 | A1* | 11/2009 | Bennett | G06F 17/275 |
| | | | | 704/3 |
| 2009/0287671 | A1* | 11/2009 | Bennett | G06F 17/289 |
| 2009/0299725 | A1* | 12/2009 | Grigsby | G06F 17/30817 |
| | | | | 704/2 |
| 2011/0270602 | A1* | 11/2011 | Liu | G06F 17/2229 |
| | | | | 704/8 |
| 2011/0301938 | A1* | 12/2011 | Agrawal | G06F 17/21 |
| | | | | 704/8 |
| 2012/0226490 | A1* | 9/2012 | Mashiah | G06F 3/0237 |
| | | | | 704/8 |
| 2013/0254553 | A1* | 9/2013 | Greene | G06F 21/10 |
| | | | | 713/189 |
| 2014/0122055 | A1* | 5/2014 | Hobson | G06F 17/218 |
| | | | | 704/8 |
| 2014/0309993 | A1* | 10/2014 | Goussard | G10L 15/063 |
| | | | | 704/231 |
| 2015/0142794 | A1* | 5/2015 | Tebbenhoff | G06F 17/30722 |
| | | | | 707/736 |

OTHER PUBLICATIONS

Ishida, Richard; Choosing a Language Tag; WC3; First published Dec. 3, 2009; Last substantive update Feb. 22, 2011.

Internationalization and Localization—Facebook Developers; Internet site (https://developers.facebook.com/docs/opengraph/guides/internationalization/); Last update Sep. 2013.

Paper of Record website; Internet site (https://paperofrecord.hypernet.ca/default.asp); retrieved Nov. 4, 2013.

ISO/DIS 2709; Information and documentation—Format for information exchange; Draft review/comment version of International Standard; International Organization for Standardization; Jul. 12, 2005.

ISO/DIS 25577; Information and documentation—MarcXchange; Draft review/comment version of International Standard; International Organization for Standardization; 2006.

Phillips, A., et al.; RFC 5646; Tags for Identifying Languages; Network Working Group; BCP 47 Specification; Sep. 2009.

Rahm, Erhard, et al.; Data Cleaning: Problems and Current Approaches; IEEE Technical Bulletin on Data Engineering; Dec. 2000.

* cited by examiner

US 9,864,793 B2

LANGUAGE TAG MANAGEMENT ON INTERNATIONAL DATA STORAGE

BACKGROUND

Public libraries, national data warehouses, public service data banks, and historical newspaper databases often collect, categorize and mine historic records. Metadata management is often used for data categorization. For example, language tags have been used in metadata to classify, archive, categorize, and process collected international documents in text, graphic, audio, and video stream data formats under certain language, script, territory, and encoding categories. The language tag may be embedded and/or integrated into collected information to support networked information processing and management. Specifically, in HTML and XML, language tags may indicate the language of text or other items in HTML and XML documents.

BRIEF SUMMARY

According to one aspect of the present disclosure a method and technique for language tag management on international data storage is disclosed. The method includes: accessing a standardized language tag repository to identify changes in repository language tags; searching records of a data source categorized using language tags to identify language tags present in records of the data source; determining whether the language tags present in the records of the data source are inconsistent with the repository language tags; responsive to determining that the language tags present in the records of the data source are inconsistent with the repository language tags, determining a language tag update policy for the data source; and performing a language tag update process for the records according to the language tag update policy to re-categorize the records based on the repository language tags.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Figure 1:
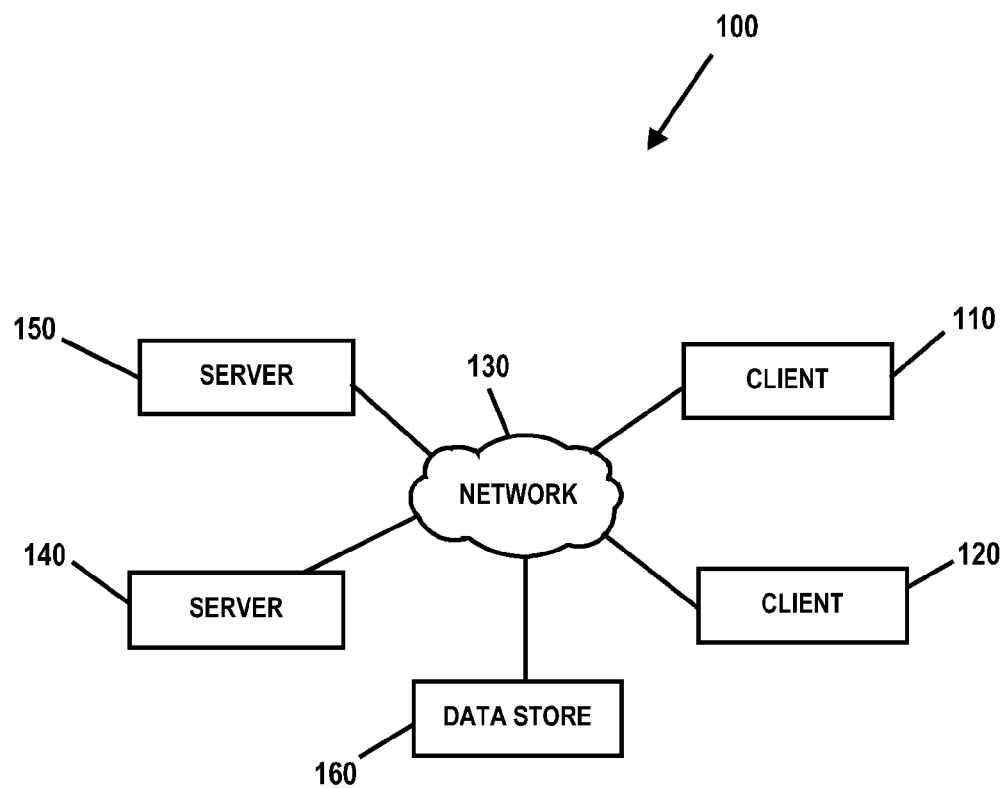
FIG. 1 is an embodiment of a network of data processing systems in which the illustrative embodiments of the present disclosure may be implemented.

Embodiments of the present disclosure provide a method, system and computer program product for language tag management on international data storage. For example, embodiments of the present disclosure enhance language tag management, update new language tags in old metadata, and re-categorize data collected from worldwide sources. For example, embodiments of the present disclosure enable stored metadata with language tags to be managed and/or updated by detecting new language tags in language tag repositories, dynamically synchronizing local language tag tables from the language tag repositories, and dynamically updating and/or re-categorizing the stored data using the new language tags according to profiles/policies established for the data source. In some embodiments, standardized language tag repositories are accessed to identify changes in repository language tags; records of a data source categorized using language tags are searched to identify language tags present in records of the data source; a determination is made whether the language tags present in the records of the data source are inconsistent with the repository language tags; and if so, a language tag update policy for the data source is determined a language tag update process for the records according to the language tag update policy is performed to re-categorize the records based on the repository language tags.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer usable or computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
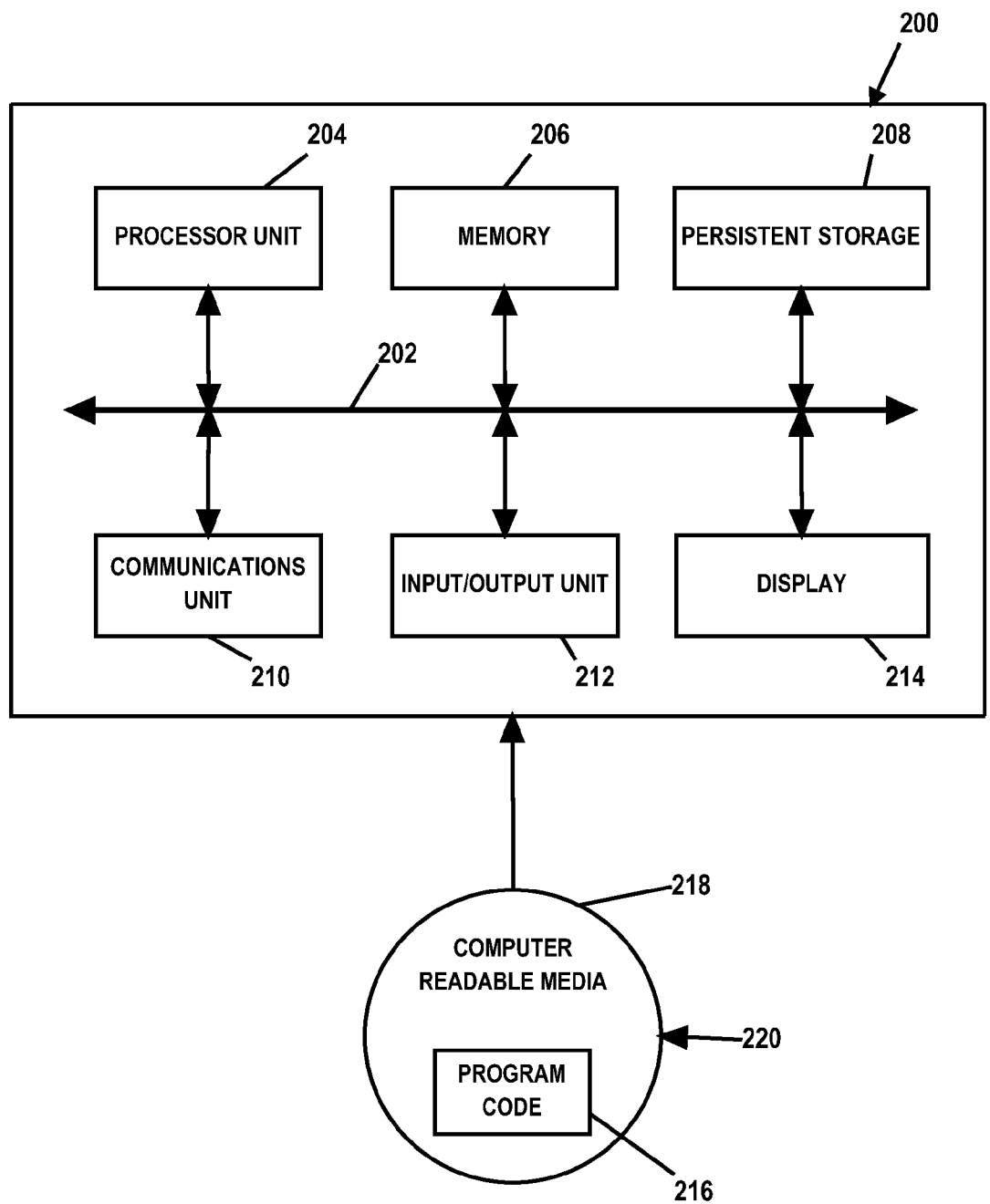
FIG. 2 is an embodiment of a data processing system in which the illustrative embodiments of the present disclosure may be implemented.

With reference now to the Figures and in particular with reference to FIGS. 1-2, exemplary diagrams of data processing environments are provided in which illustrative embodiments of the present disclosure may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing systems in which illustrative embodiments of the present disclosure may be implemented. Network data processing system 100 is a network of computers in which the illustrative embodiments of the present disclosure may be implemented. Network data processing system 100 contains network 130, which is the medium used to provide communications links between various devices and computers connected together within network data processing system 100. Network 130 may include connections, such as wire, wireless communication links, or fiber optic cables.

In some embodiments, server 140 and server 150 connect to network 130 along with data store 160. Server 140 and server 150 may be, for example, IBM® Power Systems™ servers. In addition, clients 110 and 120 connect to network 130. Clients 110 and 120 may be, for example, personal computers or network computers. In the depicted example, server 140 provides data and/or services such as, but not limited to, data files, operating system images, and applications to clients 110 and 120. Network data processing system 100 may include additional servers, clients, and other devices.

In the depicted example, network data processing system 100 is the Internet with network 130 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

FIG. 2 is an embodiment of a data processing system 200 such as, but not limited to, client 110 and/or server 140 in which an embodiment of a system for language tag management according to the present disclosure may be implemented. In this embodiment, data processing system 200 includes a bus or communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

In some embodiments, memory 206 may be a random access memory or any other suitable volatile or non-volatile storage device. Persistent storage 208 may take various forms depending on the particular implementation. For example, persistent storage 208 may contain one or more components or devices. Persistent storage 208 may be a hard drive, a flash memory, a rewritable optical disk, a rewritable magnetic tape, or some combination of the above. The media used by persistent storage 208 also may be removable such as, but not limited to, a removable hard drive.

Communications unit 210 provides for communications with other data processing systems or devices. In these examples, communications unit 210 is a network interface card. Modems, cable modem and Ethernet cards are just a few of the currently available types of network interface adapters. Communications unit 210 may provide communications through the use of either or both physical and wireless communications links.

Input/output unit 212 enables input and output of data with other devices that may be connected to data processing system 200. In some embodiments, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. For example, a storage device in data processing system 200 is any hardware apparatus that may store data. Memory 206, persistent storage 208, and computer readable media 218 are examples of storage devices in a tangible form.

Figure 3:
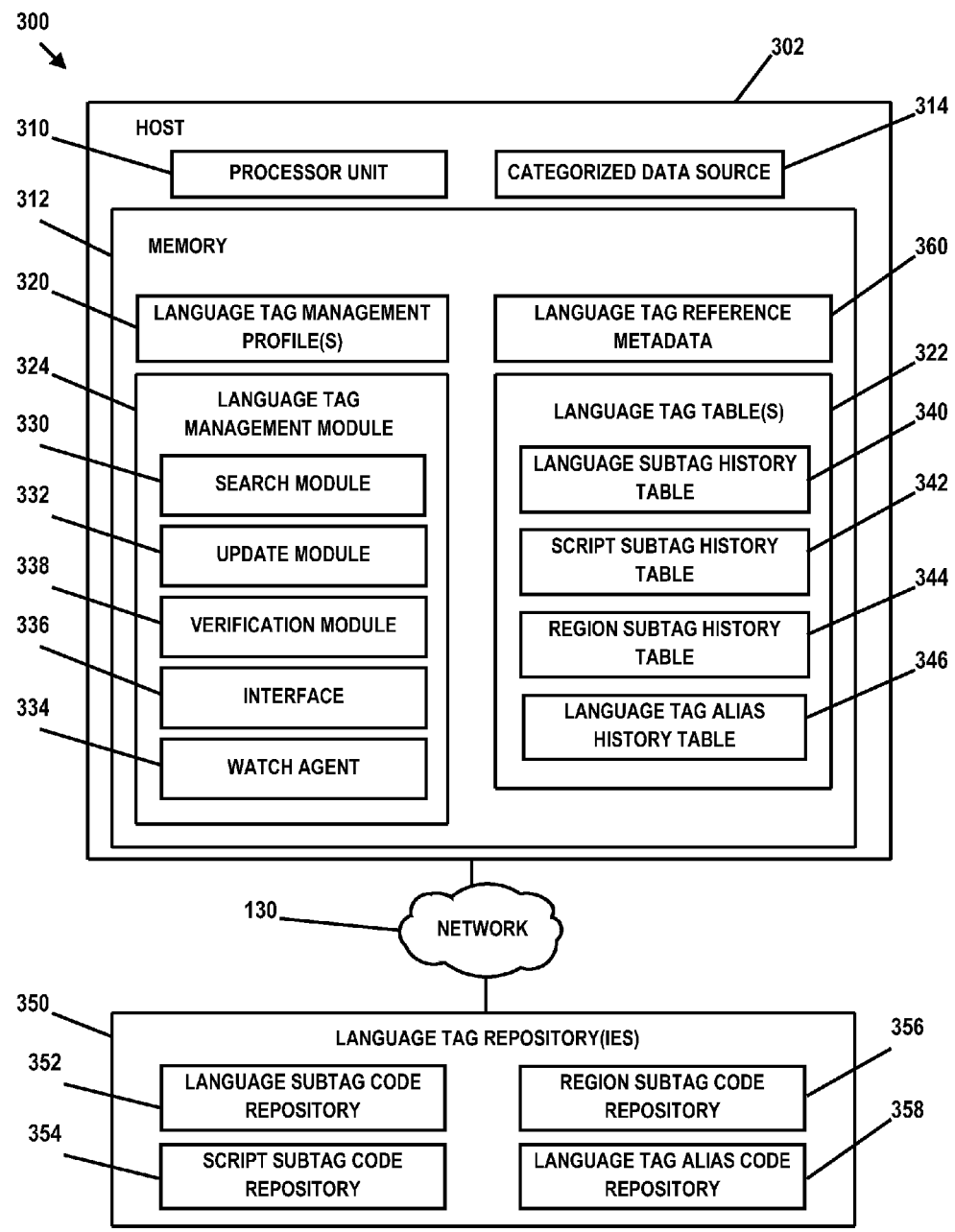
FIG. 3 is a diagram illustrating an embodiment of a data processing system for language tag management in which embodiments of the present disclosure may be implemented.

FIG. 3 is an illustrative embodiment of a system 300 for language tag management according to the present disclosure. System 300 may be implemented on data processing systems or platforms such as, but not limited to, servers 140 and/or 150, clients 110 and/or 120, or at other data processing system locations. System 300 enables the dynamic management of multilingual data collected in the past based on new language tags. For example, embodiments of the present disclosure enable stored metadata with language tags to be managed and/or updated by detecting new language tags in language tag repositories, dynamically synchronizing local language tag tables from the language tag repositories, and dynamically updating and/or re-categorizing the stored data using the new language tags.

For example, language tags are used in metadata to classify, archive, categorize, and process collected international documents in text, graphic, audio, and video stream data formats under certain language, script, territory, and encoding categories. The language tag may be embedded and/or integrated into collected information to support networked information processing and management. For example, language tags are a way to tag digital resources to indicate in the particular human language they are in. In most instances, stored materials are categorized with machine-readable cataloging XML (MARCXML), and language tags are saved as part of metadata attributes. Modern web page archiving is another example (e.g., language tags have been saved as part of web page snap-shots for different information retrieval purposes). In HTML and XML, language tags are used as a metadata attribute to indicate the language of text or other items in HTML and XML documents. The language attribute is used to specify language tags in HTML, and the xml:lang attribute is used for XML. Table 1 illustrates an example of a language tag in the Open Graph protocol, and Table 2 illustrate several examples of different language tag types and formats.

TABLE 1

```
<html>
  <head>
    <meta property="og:locale:alternate" content="fr_FR"/>
  </head>
  ...
</html>
```

TABLE 2

| Language Tag | Language | Subtags |
|---|---|---|
| en | English | language |
| mas | Masai | language |
| fr-CA | French as used in Canada | language + region |
| es-419 | Spanish as used in Latin America | language + region |
| zh-Hans | Chinese written with Simplified script | language + script |
| zh-Hans-CN | Chinese written with Simplified script in China | language + script + region |

Modern language tag syntax is defined by BCP 47 (BCP representing "Best Current Practice") and is a persistent name for a series of RFCs (Request for Comments) whose numbers change as the RFCs are updated. The latest RFC describing language tag syntax is RFC 5646, Tags for the Identification of Languages, and it obsoletes the older RFCs 4646, 3066 and 1766. Industry also refers to various ISO (International Organization for Standardization) standards (e.g., ISO 639-1, ISO 639-2, ISO 639-3, ISO-15924, ISO-3166) to create language tags for multicultural support. In addition to ISO standards, application or operating system vendors are also allowed to register their own tags from an IRNA (Internet Assigned Numbers Authority) Language Subtag Registry.

However, language tags are changed, updated, merged, split, or deprecated due to technical or political reasons. For example, since 2004, more than twenty-seven scripts have been changed and modified. One such example is that of the Chinese script "Han," which has been divided to "Hant" and "Hans" for traditional Chinese and Simplified Chinese, respectively. Due to language tag changes, the saved and collected multilingual data, the old language tags are not consistent based on different products, platforms, standards, and different historic times. Table 3 illustrates several examples of language tag changes over time.

TABLE 3

| Language | Language subtag | Script subtag | Region subtag | Language Tag | Year |
|---|---|---|---|---|---|
| Serbian (Cyrillic) | sr | | YU | sr_YU | Before 2000 |
| Serbian (Cyrillic) | sr | (Cyrl) | CS | sr_CS | 2000 |
| Serbian (Cyrillic) | sr | (Cyrl) | RS | sr_ RS | 2006 |
| Serbian (Cyrillic) | sr | Cyrl | RS | sr_Cyrl_ RS | 2011 |
| Serbian (Latin) | sh | | YU | sr_YU | Before 2000 |
| Serbian (Latin) | sh | | SP | sh_SP | 2000 |
| Serbian (Latin) | sr | Latin | CS | sr_ Latin_CS | 2006 |
| Serbian (Latin) | sr | Latin | RS | sr_ Latin_RS | 2011 |
| Hebrew | iw | | IL | iw_IL | Before 2003 |
| Hebrew | he | | IL | he_IL | 2003 |
| Chinese (Simplified) | zh | | CN | zh_CN | Before 2011 |
| Chinese (Simplified) | zh | Hans | CN | zh_Hans_CN | 2011 |
| Chinese (Traditional) | zh | | TW | zh_TW | Before 2011 |
| Chinese (Traditional) | zh | Hant | TW | zh_Hant_TW | 2011 |

Thus, some language tags and related rules have been changed over time. Different languages tags were used to store and classify information and records in a same language at different times. In other words, the stored files, records and metadata in a same language may be treated, handled and classified differently in the past, present and future. Such language tag differences cause problems in data management, data mining, and information retrieval. With the mixed old, new or even deprecated language tags in metadata files, it may be difficult to find the desired or correct information.

In the embodiment illustrated in FIG. 3, system 300 includes a host 302 (e.g., such as servers 140 and/or 150 or clients 110 and/or 120) having processor unit 310, a memory 312, and A categorized data source 314 which has been categorized using language tags (at least some of such data). Data source 314 may reside in memory 312 or be located in a separate storage location (locally or remotely relative to host 302). As illustrated in Table 3, a language tag may include a series of "subtags" where each subtag refines or narrows the range of language identified by the overall tag. In the illustrated embodiment, three language subtags are identified: 1) a language subtag; 2) a script subtag; and 3) a region subtag. The "language tag" refers to a complete tag (e.g., "zh_Hans_CN"). The language subtag is the primary language, the script subtag indicates the script or writing system variations that distinguish the written forms of a language or its dialects, and the region subtag indicates linguistic variations associated with or appropriate to a specific territory or region. It should be understood that embodiments of the present disclosure are applicable to various language tag and subtag identifiers.

In the illustrated embodiment, memory 312 includes one or more language tag management profiles 320, one or more language tag tables 322, and a language tag management module 324. Language tag management module 324 enables records/files of data source 314 with language tags to be managed and/or updated by detecting language tag changes in language tag repositories, dynamically synchronizing local language tag tables (e.g., tables 322) from the language tag repositories, and dynamically updating embedded language tags and metadata in the data of stored data source 314. For example, in FIG. 3, language tag management module 324 includes a search module 330, an update module 332, a watch agent 334, an interface 336 and a verification module 338. Language tag management module 324 may be implemented in any suitable manner using known techniques that may be hardware-based, software-based, or some combination of both. For example, language tag management module 324 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system).

Language tag management module 324 may be used to setup and/or configure one or more language tag management profiles 320. A profile 320 may be used to predefine the policies, preferences and/or rules of language tag management module 324 for managing language tag processes and/or certain policies/preferences/rules applicable to certain data stores/archives such as, but not limited to, the frequency of updating language tags, whether language tags are to be replaced/modified in data source 314, whether a new data record from the original data record should be created with new language tags (modifying the tag in the new record while leaving the original record unchanged), whether a process of mapping new/current language tags to old language tags should be performed for data source 314 (leaving original data records unchanged/intact while linking current language tag codes to the old language tag codes used in such data records), etc. Profiles 320 may be linked to a particular data source 314 source, a particular user, a combination thereof, or other features. Interface 336 may be used by a user/administrator to establish profiles 320 as well as to log, track, review, modify, analyze, and report language tags; initiate and/or control the process of replacing and mapping old language tags; controlling language tag updates; creating, supplementing and/or editing language tag tables; etc.

Language tag tables 322 may comprise information defining and/or indicating language tag history as derived from different language tag standards (e.g., RFC, ISO standards, etc.). In the embodiment illustrated in FIG. 3, tables 322 include a language subtag history table 340, a script subtag history table 342, a region subtag history table 344 and a language tag alias table 346. Tables 340, 342, 344 and 346 are used to indicate and/or identify historical changes in language codes and/or cross-references between codes of different standards, platforms and/or applications. For example, language subtag history table 340 may include language subtag code history entries such as:

sh->sr
iw->he

Script subtag history table 342 may include script subtag code history entries such as:

sh->sr-Latn
sr->sr-Cyrl
zh->zh-Hans
zh->zh-Hant

Region subtag history table 344 may include region subtag code history entries such as:

YU->CS->RS

Language tag alias table 346 may include code entries relating or cross-referencing tag codes across different standards, platforms, applications, tag codes unique to a particular user, etc., such as:

sr_Cyrl_RS, sr_Cyrl_CS, sr_CS, sr_RS, sr_YU
sr_Latn_RS, sr_Latn_CS, sh_CS, sh_RS, sh_YU In FIG. 3, management module 324 may access, or have access to, one or more language tag repositories 350 (e.g., via network 130 or other type of communication network). Language tag repositories 350 may be associated with a language tag repository or language tag standard source such as ISO, BCP, RFC, IRNA, etc., such that repository(ies) 350 contain current, standardized language tag syntax codes. In the illustrated embodiment, repositories 350 include a language subtag code repository 352, a script subtag code repository 354, a regional subtag code repository 356, and a language tag alias reference repository 358. Repositories 352, 354, 356 and 358 generally include current language tag code information, such as information pertaining to language subtag code changes, script subtag code changes, region subtag code changes, and changes related to certain platform-specific, application-specific or other types of tag codes, respectively.

As indicated above, language tag management module 324 includes watch agent 334. Watch agent 334 is configured to monitor and/or track, in real time or according to a predefined/desired schedule, language tag code changes in repositories 350. Watch agent 334 accesses repositories 350 and/or is otherwise notified (e.g., by repositories 350) of any changes to language tag codes (e.g., language subtag codes, script subtag codes, region subtag codes and/or language tag alias code references) and updates the corresponding/respective language tag tables 322. Watch agent 334 is also configured to monitor, in real time or according to a predefined/desired schedule, data source 314 (or information/records added/merged to data source 314) to identify language tags in data source 314 and, in some instances, add any discovered language tags into tables 322. For example, a database of records may be merged into data source 314, and the merged records may contain language tags that have been replaced with newer language tags, language tags that are not reflected in tables 322, etc. Watch agent 334 may monitor and/or automatically analyze added/merged records of data source 314 and initiate a corresponding action (e.g., if profile 320 indicates, replace language tags in the merged records; generate an alert regarding the discovered language tags; interface with repositories 350 to acquire change-related information of such language tags; add information to tables 322 regarding the discovered language tags; etc.). Watch agent 334 may also be configured to monitor repositories 350 and/or data source 314 and alert a user/administrator of any changes to language tags and/or any discovered language tags in data source 314 (e.g., as a result of added/merged records into data source 314).

Search module 330 is configured to find language tags in data source 314 and tie/relate the discovered language tags in data source 314 to new language tags as set forth in tables 322. Search module 330 may perform nested search loops to find language tags in data source 314 (e.g., first round: search based on language subtag history code table 340; second round: search based on script subtag history code table 342; third round: search based on region subtag history code table 344; and fourth round: search based on alias history code table 346) and tie/relate discovered tags in data source 314 to the new tag codes according to tables 322. In some embodiments, search module 330 may be configured to find all related language tags in data source 314 from a single language tag input (e.g., via interface 336).

Update module 332 is configured to perform real time language tag update processing in data source 314 and/or perform virtualized metadata generation for data source 314 based on current language tag codes. For example, based on a user's options and/or profile 320, module 332 may search data source 314, find old and inconsistent language tags in data source 314, and then either replace the old tags with current language tags or use an abstraction layer (such as generating new virtualized metadata (e.g., a metadata of metadata)) to map the old and inconsistent language tags to the current language tag. For example, in one embodiment, update module 332 may automatically replace the old language tags in data source 314 with the current language tags. However, in some instances, replacement of the old tag with the new tag may be undesirable (e.g., a user may not want to destroy and/or modify the integrity of the original data record). Thus, in another embodiment, instead of replacing or updating the old tag with the current tag in a data source 314 record, update module 332 may be configured to create a reference metadata 360 (file_ID, old_langTag, new_langTag) and link the created reference metadata 360 to the data source 314 record, thereby mapping the old language tag to the new language tag for the data source 314 record.

Verification module 338 is configured to verify that language tag replacement/updating has been performed correctly and/or verify that reference metadata 360 links to the corresponding data source 314 record. For example, in some embodiments, verification module 338 may track updated/changed data source 314 records and verify that the updated/changed records contain the current language tags and/or may be otherwise located based on the current language tags. If not, verification module 338 may be configured to undo and/or reverse the process and generate an alert regarding an unsuccessful update/replace operation. In some embodiments, verification module 338 may be configured to generate a copy and/or alternate data source 314 record, update the language tag, verify its accuracy, then replace the original data source 314 record with the updated record. Verification module 338 may also generate log files corresponding to the records to be updated and the records after updating and verify that the same records (or quantity of records) or log file information matches for a particular language tag update process. Thus, it should be understood that verification module 338 may be configured to verify acceptable language tag processing using a variety of different techniques.

Thus, in operation, management module 324 may interface with language tag repositories 350 and determine/identify any changes to language tag codes. Management module 324 may then automatically update language tag tables 322 to reflect the historic change(s) in such language tag codes. Management module 324 may also automatically (e.g., depending on certain rules and/or processes set in a particular profile 320) process data source 314 with the new/updated language tag code information (e.g., update, modify and/or create reference metadata based on the new language tag codes, generate a report indicating language tag status information, etc.). Management module 324 may then automatically verify that the language tag processing for data source 314 has been performed correctly.

Figure 4:
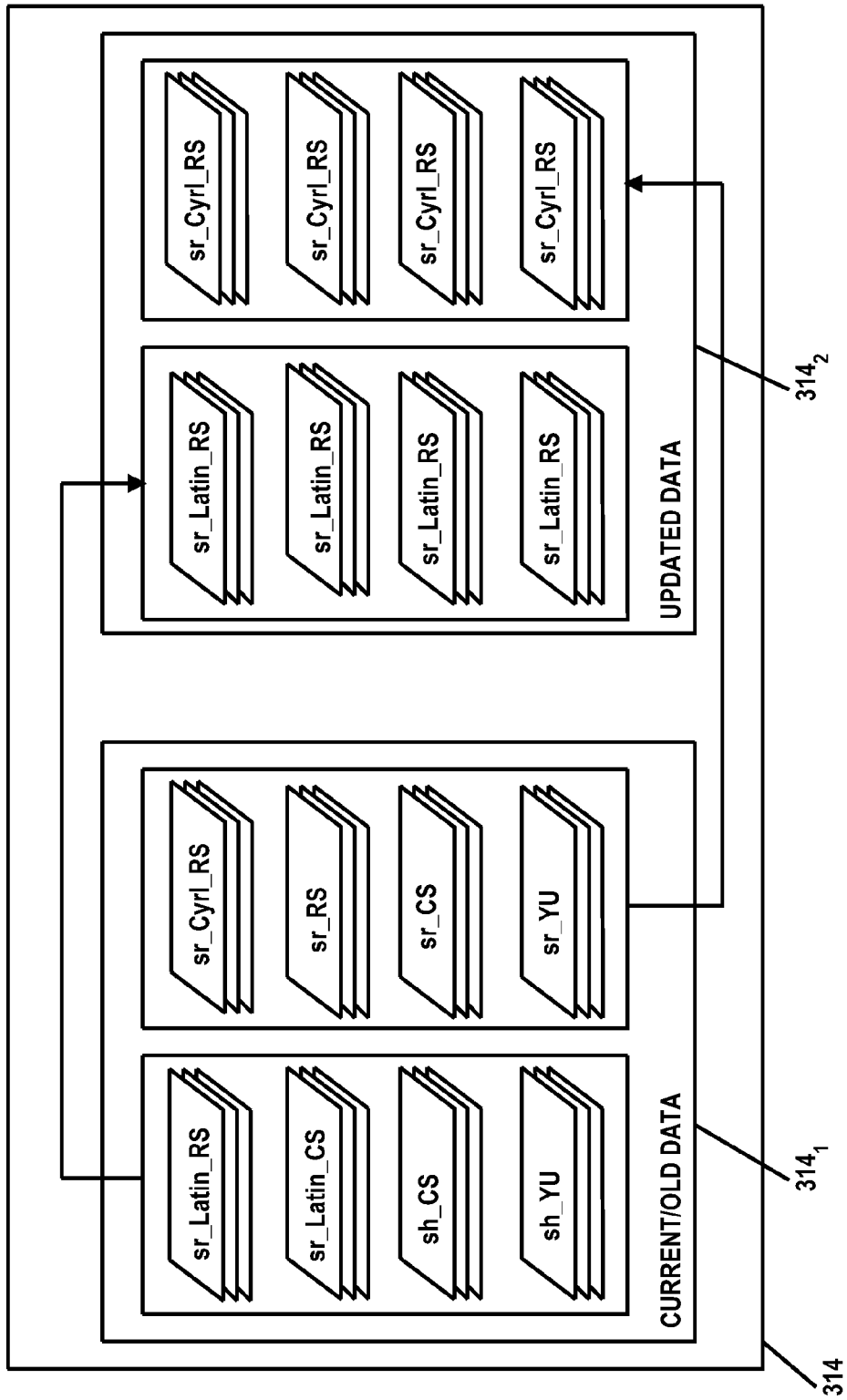
FIG. 4 is a diagram illustrating a language tag update process according to an embodiment of the present disclosure.

FIG. 4 is a diagram illustrating language tag replacement according to the present disclosure. As discussed above, in some instances data source 314 may comprise old and/or inconsistent language tags based on current standard language tags. Management module 324 may search data source 314 (e.g., the existing or old records of data source $314_1$), locate language tags in such data records, determine current language tags based on language tag tables 322, and automatically replace the language tags, thereby creating updated records of data source $314_2$ with the current language tags. Management module may track which records are being updated and verify that the updated records have been updated with the current language tags correctly.

Figure 5:
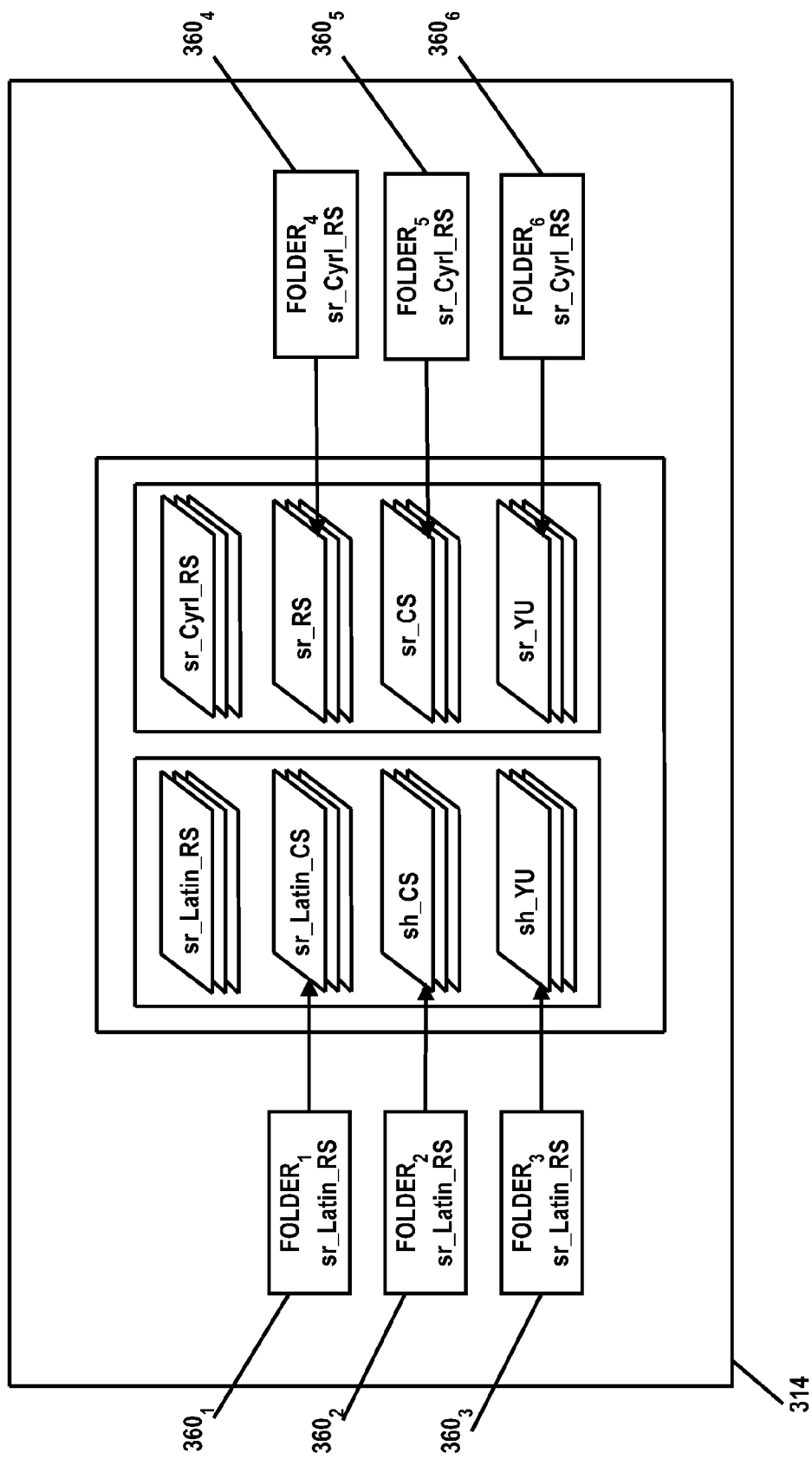
FIG. 5 is a diagram illustrating another embodiment of a language tag update process using an abstraction layer for language tags according to the present disclosure.

FIG. 5 is a diagram illustrating another embodiment of language tag replacement according to the present disclosure. As described earlier, data source 314 may comprise records that a user does not want to modify or cannot modify without adversely affecting the integrity or characteristics of such data (or for another reason). In this embodiment, instead of modifying and/or replacing the language tag in such data records, relational metadata is created linking the affected data records (and the old language tags thereof) to the current language tags. For example, in the illustrated embodiment, certain data source 314 records may be organized into folders or other types of groupings (although such groupings are not necessary) where the data records of particular folders reference or use old language tags. Management module 324 searches data source 314, identifies the old language tags in data source 314, identifies current language tags from tables 322, and creates language tag reference metadata 360 that tie/link the current language tag to the old language tag. For example, in FIG. 5, metadata $360_1$ is created for $folder_1$ to link the current language tag sr_Latin_RS to a folder of data records using the old language tag sr_Latin_CS. Metadata $360_2$ is created for $folder_2$ to link the current language tag sr_Latin_RS to a folder of data records using the old language tag sh_CS. Metadata $360_3$ is created for $folder_3$ to link the current language tag sr_Latin_RS to a folder of data records using the old language tag sh_YU. Metadata $360_4$ is created for $folder_4$ to link the current language tag sr_Cyrl_RS to a folder of data records using the old language tag sr_RS. Metadata $360_5$ is created for $folder_5$ to link the current language tag sr_Cyrl_RS to a folder of data records using the old language tag sr_CS. Metadata $360_6$ is created for $folder_6$ to link the current language tag sr_Cyrl_RS to a folder of data records using the old language tag sr_YU. The reference metadata 360 may be stored as part of data source 314 or be otherwise located. Thus, when searching for data using the current language tags, reference metadata 360 will point/link to data records using the old language tags, thereby enabling the old, original data records to remain intact.

Figure 6:
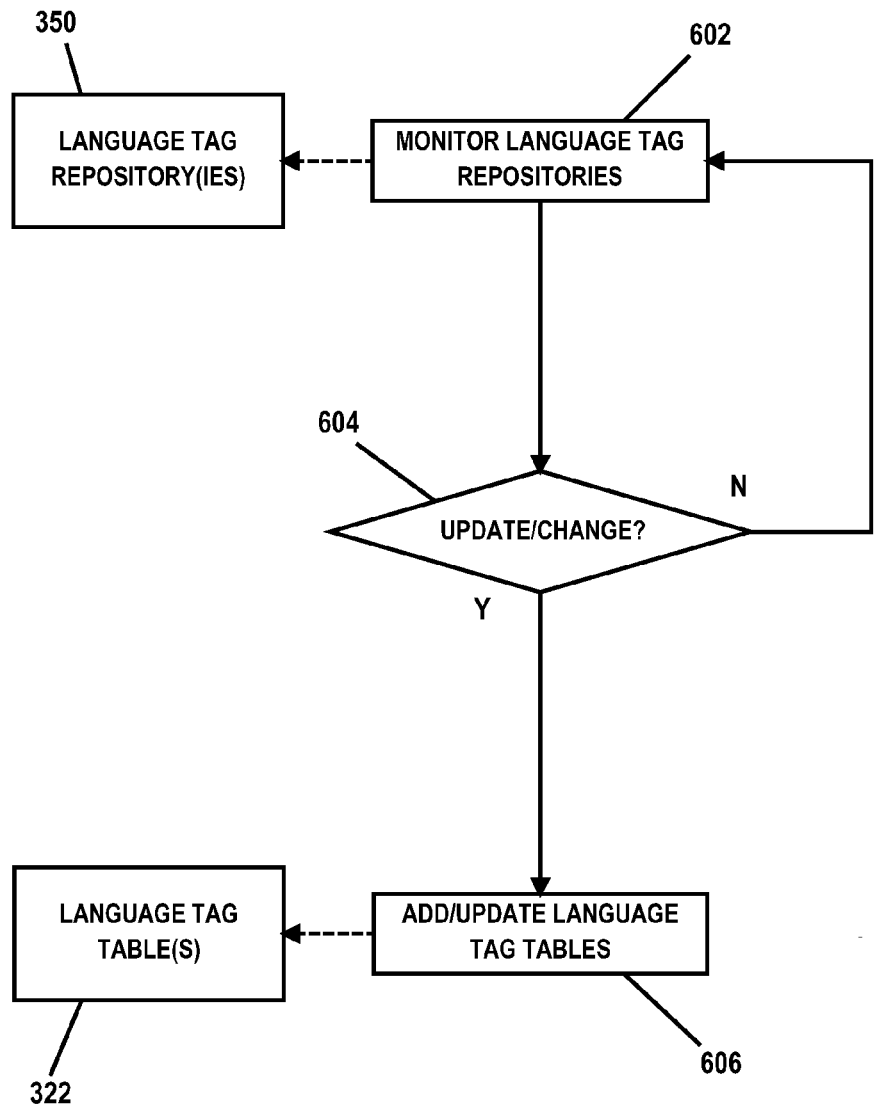
FIG. 6 is a flow diagram illustrating a method for language tag management according to the present disclosure.

FIG. 6 is a flow diagram illustrating an embodiment of a method for language tag management according to the present disclosure. The method begins at block 602, where watch agent 334 monitors language tag repository(ies) 350 for changes and/or updates to language tag codes. At decisional block 604, a determination is made whether a change and/or update to a language tag code has occurred. If not, the method continues monitoring language tag respository(ies) 350 for changes and/or updates to language tag codes. If at decisional block 604 a determination is made that an update and/or change to a language tag code has occurred, the method proceeds to block 606, where watch agent 334 adds and/or updates the corresponding language tag code in language code history tables 322.

Figure 7:
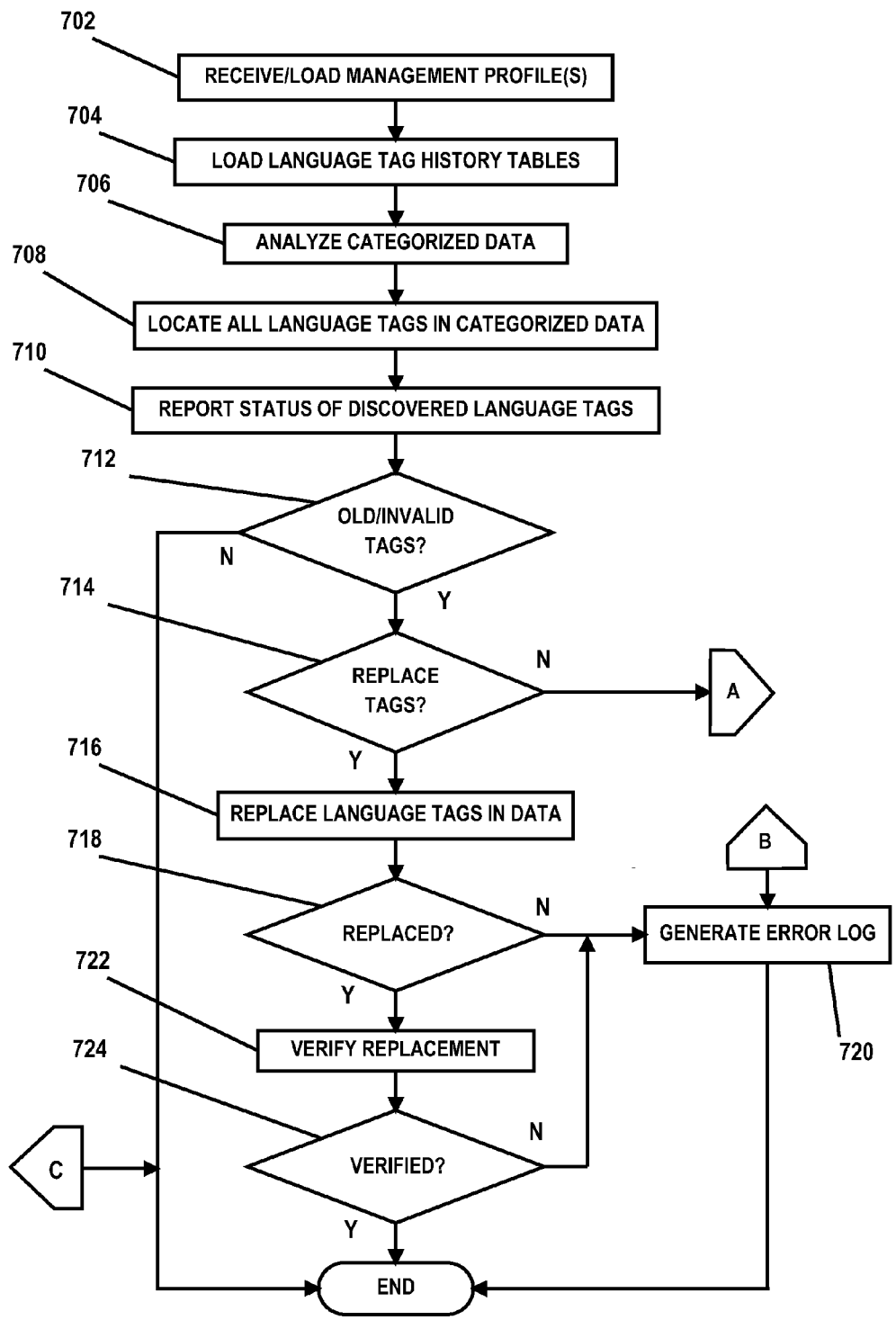
FIG. 7 is a flow diagram illustrating another embodiment of a method for language tag management according to the present disclosure.
Figure 7:
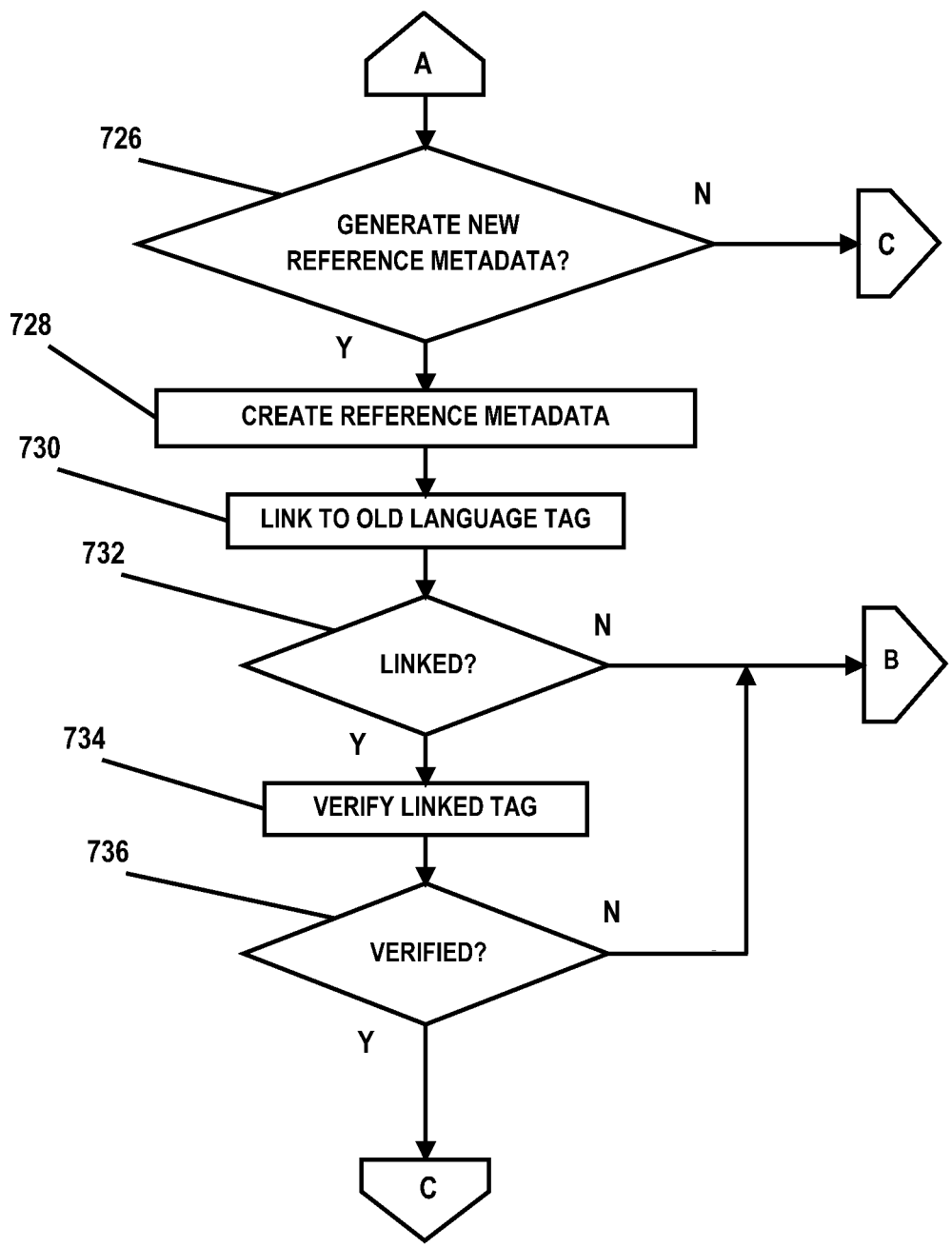

FIG. 7 is a flow diagram illustrating an embodiment of a method for language tag management according to the present disclosure. The method begins at block 702, where language tag management profile(s) 320 may be setup and/or loaded. At block 704, management module 324 loads and/or otherwise accesses language tag history tables 322. At block 706, management module 324 analyzes data source 314. At block 708, management module 324 identifies language tags used in data source 314. At block 710, management module 324 reports the status of the discovered language tags. For example, in some embodiments, management module 324 may generate a report and/or otherwise make available status information identifying the discovered language tags, indicating whether certain language tags are obsolete or have been otherwise replaced/updated, indicating language tags that require additional information (e.g., perhaps indicating that there is a lack of history information for the discovered language tag in tables 322), etc.

At decisional block 712, a determination is made whether data source 314 contains old, invalid or outdated language tags. For example, management module 324 may evaluate the discovered tags in data source 314 with information in tables 322 to determine whether the discovered tags have been updated/changed. If not, no further action may be needed. However, if data source 314 does contain old/invalid language tags, the method proceeds to decisional block 714, where a determination is made whether the old/invalid tags should be replaced. For example, management module 324 may evaluate profile 320 to determine whether the old/invalid language tags should be automatically replaced or whether another action, if any, should be performed. If the old/invalid language tags are to be replaced, the method proceeds to block 716, where management module 324 replaces the old/invalid language tags in data source 314 with the current language tags. At decisional block 718, a determination is made whether the language tags were replaced. For example, if data source 314 cannot be modified or management module 324 encounters a condition preventing management module 324 from successfully replacing/updating the language tag in data source 314, management module 324 may generate an error log at block 720 detailing the condition of such condition.

If the language tags were replaced/updated, the method proceeds from decisional block 718 to block 722, where management module 324 verifies the language tag replacement/update process. As indicated above, management module 324 may verify that the updated records of data source 314 may be located using the current language tags, search data source 314 again to verify that no old/invalid language tags remain in data source 314, compare log files of data source 314 before and after language tag replacement, or perform other actions to verify the successful updating of the old language tags with current language tag codes. At decisional block 724, a determination is made whether the language tag replacement/update process has been successfully verified. If not, the method proceeds to block 720, where management module 324 may generate an error log indicating the details of the lack of verification. If the language tag replacement/update process is verified at decisional bloc 724, the method ends.

At decisional block 714, if replacement/updating of the discovered old/invalid language tags are not to be replaced, the method proceeds to decisional block 726, where a determination is made whether language tag reference metadata 360 is to be generated for the discovered language tags. For example, as indicated earlier, certain data records may be compromised if the records are changed. Thus, it may be undesirable to modify/replace old language tags in such data. If reference metadata 360 is not to be created (e.g., if another method to link the old tags to the new tags is desired or if further review/analysis of data source 314 is needed), the method ends. If reference metadata 360 is to be created, the method proceeds to block 728, where management module 324 creates the language tag reference metadata for the old language tag based on the current language tag (e.g., by using information in tables 322). At block 730, management module 324 links the reference metadata 360 to the old language tag. At decisional block 732, a determination is made whether the reference metadata 360 has been linked to the old language tag. If not, the method proceeds to block 720, where management module 324 may generate an error log indicating details of the unsuccessful linking. If linking is successful, the method proceeds to block 734, where management module 324 verifies the linking of the reference metadata 360 to the old language tags. For example, management module 324 may verify that the records of data source 314 linked by the reference metadata 360 may be located using the current language tags or perform other actions to verify the successful linking of the old language tags to the current language tag codes. If verification is unsuccessful, the method proceeds to block the method proceeds to block 720, where management module 324 may generate an error log indicating details of the unsuccessful verification. If verification is successful, the method ends.

Thus, embodiments of the present disclosure enables the dynamic management of multilingual data collected in the past based on new language tags. For example, embodiments of the present disclosure enable stored data with language tags to be managed and/or updated by detecting new language tag changes in language tag repositories, dynamically synchronizing local language tag tables from the language tag repositories, and dynamically updating embedded language tags and metadata in stored data.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method, comprising:

accessing a standardized language tag repository to identify changes in repository language tags;

searching records of a data source stored in a memory where one or more of the records are categorized using language tags as metadata attributes to identify language tags present in the records of the data source;

determining whether the language tags present in the records of the data source are inconsistent with the repository language tags;

responsive to determining that the language tags present in the records of the data source are inconsistent with the repository language tags, determining a language tag update policy for the data source;

responsive to determining that the language tag update policy indicates preserving an integrity of a first set of the records of the data source, creating a reference metadata based on the repository language tags;

linking the reference metadata to the respective first set of records having inconsistent language tag metadata attributes while maintaining the first set of data records intact with the inconsistent language tag metadata attributes; and performing a language tag update process for a second set of the records having inconsistent language tag metadata attributes according to the language tag update policy to replace the inconsistent language tag metadata attributes based on the repository language tags.

2. The method of claim 1, further comprising:

monitoring the standardized language tag repository for a change to a repository language tag; and responsive to detecting a change to the repository language tag, automatically updating a language tag table with a change history for the repository language tag.

3. The method of claim 2, further comprising identifying the language tags in the records of the data source inconsistent with the repository language tags based on the change history in the language tag table.

4. The method of claim 2, further comprising:

monitoring the data source for added records;

in response to detecting added records, determining whether the added records have language tags inconsistent with the repository language tags based on the language tag table; and in response to determining that the added records have language tags inconsistent with the repository language tags, automatically performing the language tag update process for the added records according to the language tag update policy.

5. The method of claim 1, further comprising, upon completion of the language tag update process, automatically verifying the consistency of the language tag metadata attributes of the records of the data source based on the repository language tags.

* * * * *